United States Patent
Adachi

(10) Patent No.: US 7,894,129 B2
(45) Date of Patent: Feb. 22, 2011

(54) LASER DEVICE AND OPTICAL AMPLIFIER

(75) Inventor: Takashi Adachi, Kanagawa-ken (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 12/191,330

(22) Filed: Aug. 14, 2008

(65) Prior Publication Data

US 2008/0316592 A1 Dec. 25, 2008

Related U.S. Application Data

(62) Division of application No. 11/764,271, filed on Jun. 18, 2007.

(30) Foreign Application Priority Data

Jun. 26, 2006 (JP) ............................. 2006-175392

(51) Int. Cl.
*H04B 10/17* (2006.01)
*H01S 3/16* (2006.01)

(52) U.S. Cl. .................. 359/343; 359/333; 359/337.1; 372/40; 372/68; 372/70

(58) Field of Classification Search ................ 359/333, 359/337.1, 343; 372/40, 68, 70
See application file for complete search history.

(56) References Cited

U.S. PATENT DOCUMENTS

| | | | | |
|---|---|---|---|---|
| 3,626,318 A | * | 12/1971 | Young | 372/67 |
| 4,125,816 A | * | 11/1978 | Boling et al. | 372/68 |
| 4,173,738 A | * | 11/1979 | Boling et al. | 359/343 |
| 4,680,769 A | * | 7/1987 | Miller | 372/50.22 |
| 4,794,346 A | * | 12/1988 | Miller | 359/344 |
| 4,860,301 A | * | 8/1989 | Nicholson | 372/68 |
| 4,956,843 A | * | 9/1990 | Akhavan-Leilabady et al. | 372/23 |
| 5,172,387 A | * | 12/1992 | Fink | 372/68 |
| 5,289,482 A | * | 2/1994 | Esterowitz et al. | 372/41 |
| 5,321,711 A | * | 6/1994 | Rapoport et al. | 372/41 |
| 5,327,282 A | * | 7/1994 | Takeda et al. | 359/341.5 |
| 5,689,519 A | | 11/1997 | Fermann et al. | |
| 5,912,912 A | * | 6/1999 | Caprara et al. | 372/25 |
| 5,930,283 A | | 7/1999 | Imai et al. | |
| 5,956,354 A | * | 9/1999 | Yan | 372/18 |

(Continued)

FOREIGN PATENT DOCUMENTS

JP 06-244486 9/1994

(Continued)

OTHER PUBLICATIONS

Hönninger et al., "Femtosecond Yb:YAG laser using semiconductor saturable absorbers," Optics Letters, vol. 20, No. 23, Dec. 1, 1995, pp. 2402-2404.

*Primary Examiner*—Eric Bolda
(74) *Attorney, Agent, or Firm*—Sughrue Mion, PLLC

(57) ABSTRACT

Laser light emission across a wide bandwidth emission spectrum is enabled in a laser amplifier equipped with solid gain media. The laser amplifier is equipped with: a resonator; a plurality of solid gain media, having fluorescent spectra that a least partially overlap with each other, provided within the resonator; and pumping means, for pumping the plurality of solid gain media. The entire fluorescent spectrum width of the plurality of solid gain media is greater than the fluorescent spectrum width of each solid gain medium.

11 Claims, 2 Drawing Sheets

U.S. PATENT DOCUMENTS

| | | | |
|---|---|---|---|
| 6,115,402 A * | 9/2000 | Caprara | 372/101 |
| 6,266,180 B1 * | 7/2001 | Inagaki et al. | 359/337 |
| 6,307,872 B1 | 10/2001 | Tomaru et al. | |
| 6,469,825 B1 * | 10/2002 | Digonnet et al. | 359/341.5 |
| 6,618,423 B1 | 9/2003 | Dekorsy et al. | |
| 6,665,320 B1 | 12/2003 | Arbore et al. | |
| 7,413,847 B2 * | 8/2008 | Bullington et al. | 430/321 |
| 7,440,171 B2 * | 10/2008 | Liu et al. | 359/337.3 |
| 2003/0053507 A1 | 3/2003 | Islam et al. | |
| 2003/0058904 A1 | 3/2003 | Krainer et al. | |
| 2006/0092993 A1 | 5/2006 | Frankel | |

FOREIGN PATENT DOCUMENTS

WO       98/59399 A1    12/1998

* cited by examiner

LASER DEVICE AND OPTICAL AMPLIFIER

This is a divisional of application Ser. No. 11/764,271 filed Jun. 18, 2007. The entire disclosure of the prior application, application Ser. No. 11/764,271, is hereby incorporated by reference.

BACKGROUND OF THE INVENTION

1. Field of the Invention

The present invention relates to a laser device and an optical amplifier. Particularly, the present relates to a laser device and an optical amplifier equipped with a plurality of solid gain media.

2. Description of the Related Art

Laser media having wide emission wavelength bands are favorably used in short pulse lasers (mode locked lasers). Materials to which Yb (ytterbium) ions, which are rare earth ions, are added (as disclosed in "Femtosecond Yb:YAG laser using semiconductor saturable absorbers", C. Honninger et al., Optics Letters, Vol. 20, No. 23, pp. 2402-2404, 1995), glass to which Nd (neodymium) ions are added (as disclosed in Japanese Unexamined Patent Publication No. 6 (1994)-244486), and materials to which Ti (titanium) ions, which are transition metal ions, are added (as disclosed in U.S. Pat. No. 6,618,423) are known laser media having wide emission wavelength bands, particularly as solid laser media (solid gain media). Fibers to which Er (erbium) is added (as disclosed in U.S. Pat. No. 5,689,519) and the like are known as laser media having wide emission wavelength bands, as fiber lasers. Short pulse lasers of the p (pico) second and f (femto) second class require laser media having extremely wide emission wavelength bands. Therefore, conventional short pulse lasers of these classes were limited to employing laser media such as those described above, that is, the wavelengths of the lasers were limited to the infrared range. In addition, four level system Nd ions, which are advantageous in laser emission within the 1 μm band, have narrow emission widths if used with YAG ($Y_3Al_5O_{12}$) as the base material, and cannot be utilized for short pulse lasers. Accordingly, glass base materials are used with these ions, in order to widen the emission width. However, glass has a low coefficient of thermal conduction, and therefore there is a problem that Nd ion added glass solid lasers are not suited for high output laser emission.

Various methods, such as those employing semiconductor lasers, pigment lasers, Ti:Sapphire lasers, and OPO (Optical Parametric Oscillators) have been proposed to realize wavelength variable lasers. Particularly, many wavelength variable lasers employing semiconductor lasers are currently being developed. However, the emission ranges of these lasers are mostly within the infrared-near infrared range, and emission in only blue and violet color ranges have been realized within the visible light spectrum. Ti:Sapphire lasers are commonly employed as wavelength variable lasers, but the emission wavelengths thereof are limited to the near infrared range. These infrared-near infrared range emitting lasers are able to emit light within the visible light spectrum by utilizing SHG (Second Harmonic Generation). However, laser emission within the visible light spectrum utilizing SHG cannot realize high efficiency nor stable operation. In contrast, pigment lasers have a mean variable wavelength range of approximately 50 nm in the case that a single pigment is employed, but it is possible to emit laser light within the ultraviolet-infrared wavelength range by utilizing a plurality of types of pigment. However, pigments have the problem that they deteriorate, and a drawback that pump light sources are expensive for shorter wavelengths. Meanwhile, OPO's are capable of covering a comparatively wide variable wavelength range, but there are problems, such as beam quality. Accordingly, there are advantages and drawbacks to currently available variable wavelength lasers, and industrial application thereof is difficult.

As described above, there is demand for a device which is capable of stably emitting laser light across a wide spectral band ranging from infrared through the visible light spectrum as either a short pulse laser or as a variable wavelength laser. In addition, there is similar demand for an optical amplifier for amplifying laser beams.

SUMMARY OF THE INVENTION

The present invention has been developed in view of the foregoing circumstances. It is an object of the present invention to provide a laser device capable of emitting laser light across a wide spectral band. It is another object of the present invention to provide an optical amplifier capable of amplifying seed light beams having wide wavelength bands.

A laser device of the present invention comprises:

a resonator;

a plurality of solid gain media, having fluorescent spectra that at least partially overlap with each other, provided within the resonator; and pumping means, for pumping the plurality of solid gain media; wherein:

the entire fluorescent spectrum width of the plurality of solid gain media is greater than the fluorescent spectrum width of each solid gain medium.

Here, the "fluorescent spectrum width" refers to the full width at half maximum of a peak wavelength within the fluorescent spectrum band. In the case that a plurality of peak wavelengths exist, the fluorescent spectrum width is defined to be the widest full width at half maximum from among those of the peak wavelengths. The "entire fluorescent spectrum width" refers to the full width at half maximum of a peak wavelength within an entire fluorescent spectrum band, formed by the partially overlapping fluorescent spectrum bands of the plurality of solid gain media. In the case that a plurality of peak wavelengths exist, the entire fluorescent spectrum width is defined to be the full width at half maximum of the peak wavelengths within a desired emission wavelength range.

The pumping means may comprise a single pump light source or a plurality of pump light sources, as long as it is capable of pumping the plurality of solid gain media simultaneously.

It is desirable for the number and wavelength of fluorescent peaks of each of the plurality of solid gain media to be selected, and the solid gain media to be arranged such that the entire fluorescent spectrum width becomes a desired value. Further, it is desirable for the plurality of solid gain media to be arranged with the fluorescent intensities thereof being adjusted.

Alternatively, the wavelength, number, and power of pump light beams emitted from the pumping means may be selected such that the entire fluorescent spectrum width becomes a desired value.

It is desirable for the plurality of solid gain media to be integrated. Here, the term "integrated" refers to a state in which the light entrance and emission surfaces of the plurality of solid gain media are in contact with each other, or a state in which the plurality of solid gain media are in monolithic form. In addition, individually formed solid gain media may be coupled by adhesive, optical contacts, or the like. As a further alternative, each of the solid gain media may be of a polycrystalline structure, which are then stacked and sintered to be integrated.

In the case that the plurality of solid gain media are integrated, it is desirable for each of the plurality of solid gain media to be of a polycrystalline structure. In this case, it is desirable for each of the plurality of solid gain media to comprise rare earth ions added to a base material having one of a garnet type structure, a C rare earth type structure, and a perovskite type structure. Further, it is desirable for the plurality of solid gain media to have the same base material, to which the same rare earth ions are added.

The laser device of the present invention may be employed favorably as either a mode locked laser device or a variable wavelength laser device.

The laser device of the present invention may further comprise:

at least one wavelength converting element, for converting the wavelength of light beams emitted from the solid gain media; wherein:

wavelength converted light beams are output.

An optical amplifier of the present invention comprises:

a plurality of solid gain media, having fluorescent spectra that at least partially overlap with each other; and pumping means, for pumping the plurality of solid gain media; wherein:

the entire fluorescent spectrum width of the plurality of solid gain media is greater than the fluorescent spectrum width of each solid gain medium. Note that it is desirable for the fluorescent peak wavelength of each of the plurality of solid gain media to be different. The "fluorescent spectrum width" and the "entire fluorescent spectrum width" are defined in the same manner as in the aforementioned laser device.

The pumping means of the optical amplifier may comprise a single pump light source or a plurality of pump light sources, as long as it is capable of pumping the plurality of solid gain media simultaneously.

It is desirable for the number and wavelength of fluorescent peaks of each of the plurality of solid gain media to be selected, and the solid gain media to be arranged such that the entire fluorescent spectrum width becomes a desired value. Further, it is desirable for the plurality of solid gain media to be arranged with the fluorescent intensities thereof being adjusted.

The wavelength, number, and power of pump light beams emitted from the pumping means may be selected such that the entire fluorescent spectrum width becomes a desired value.

It is desirable for the plurality of solid gain media to be integrated. The definition of the term "integrated" is the same as that for the aforementioned laser device.

In the case that the plurality of solid gain media are integrated, it is desirable for each of the plurality of solid gain media to be of a polycrystalline structure. In this case, it is desirable for each of the plurality of solid gain media to comprise rare earth ions added to a base material having one of a garnet type structure, a C rare earth type structure, and a perovskite type structure. Further, it is desirable for the plurality of solid gain media to have the same base material, to which the same rare earth ions are added.

The laser device of the present invention is equipped with the plurality of solid gain media having fluorescent spectrum bands that at least partially overlap with each other, within the resonator. The entire fluorescent spectrum width of the plurality of solid gain media is greater than the fluorescent spectrum width of any one solid gain medium. Therefore, the combination of the solid gain media enables emission of laser light over a wide wavelength range from visible light to infrared light. Solid gain media are more stable than pigment, resulting in a laser device having high stability.

The optical amplifier of the present invention is equipped with the plurality of solid gain media having fluorescent spectrum bands that at least partially overlap with each other. The entire fluorescent spectrum width of the plurality of solid gain media is greater than the fluorescent spectrum width of any one solid gain medium. Therefore, the combination of the solid gain media enables emission of laser light over a wide wavelength range from visible light to infrared light.

BEST MODE FOR CARRYING OUT THE INVENTION

Hereinafter, embodiments of the present invention will be described in detail with reference to the attached drawings.

Figure 1:
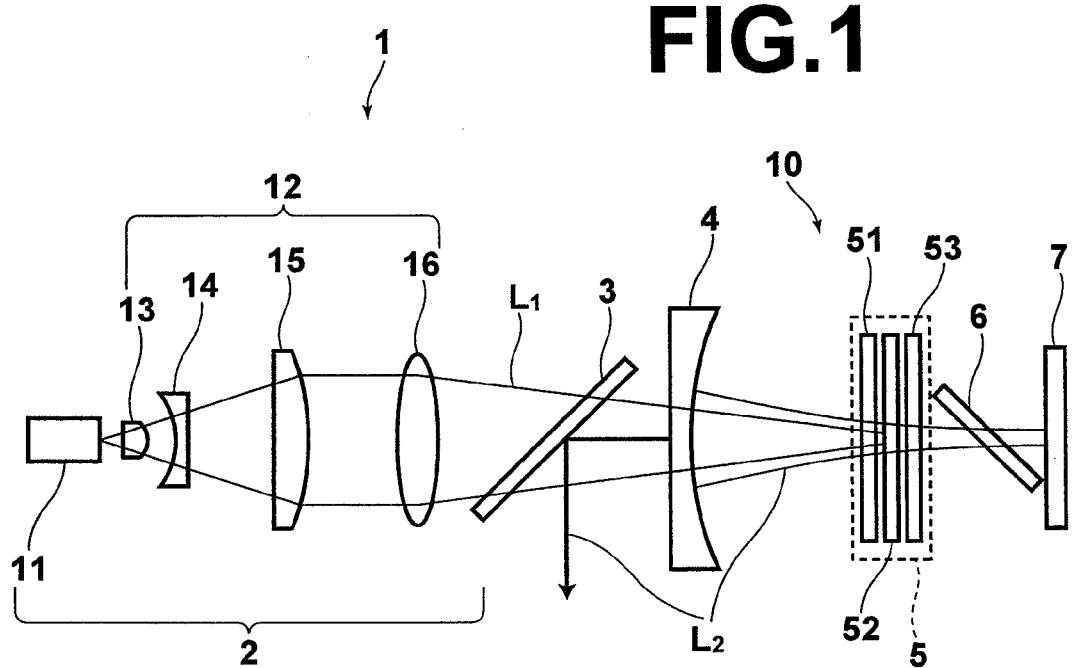
FIG. 1 is a schematic diagram that illustrates the construction of a laser device according to a first embodiment of the present invention.

FIG. 1 is a schematic diagram that illustrates the construction of a laser device 1 according to a first embodiment of the present invention. The laser device 1 comprises: a laser media group 5 and a pumping means 2. The laser media group 5 is constituted by a resonator 10 and a plurality of solid gain media 51, 52, and 53, which are provided within the resonator 10 and have fluorescent spectrum bands that at least partially overlap with each other. The pumping means 2 is provided to pump the plurality of solid gain media 51, 52, and 53.

The pumping means 2 comprises: a semiconductor laser 11, for emitting a laser beam $L_1$ as a pump light beam; and a focusing optical system 12, for leading the laser beam $L_1$ to the resonator 10.

The resonator 10 is constituted by a concave mirror 4 and a semiconductor saturable absorber mirror 7 (by BATOP Co., hereinafter, referred to as "SESAM"). A Brewster plate 6 is further provided within the resonator 10 as a polarization control means.

The laser media group 5 receives the laser bean $L_1$ as a pump light beam, and emits solid state laser light beams. The SESAM 7 causes mode locked operation, and a pulsed laser beam $L_2$ is output from the concave mirror 4. The output laser beam $L_2$ is led to the exterior by a dichroic mirror 3, which is provided between the focusing optical system 12 and the concave mirror 4.

The plurality of solid gain media 51, 52, and 53 are characterized by the entire fluorescent spectrum width thereof being greater than the fluorescent spectrum width of any one of the solid gain media 51, 52, and 53. A specific example will be described below.

The laser media group 5 may be constituted by arranging a $Lu_3Ga_5O_{12}$ medium 51, a $Gd_3Sc_2Al_3O_{12}$ medium 52, and a $Gd_3Sc_2Ga_3O_{12}$ medium 53 in this order, from the direction in which the laser beam $L_1$ enters. All of the media 51, 52, and 53 are of the garnet type, and Nd ions are added to each of the media 51, 52, and 53. In this case, the fluorescent peak wavelengths of each of the media 51, 52, and 53 are 1062.3 nm, 1059.9 nm, and 1061.2 nm, respectively. The fluorescent spectrum widths of each of the media 51, 52, and 53 are 1.02 nm, 1.1 nm, and 1.6 nm, respectively. The Nd concentration within each of the laser media 51, 52, and 53 is 1 at %, such that the amount of pumping light absorbed by the laser medium 52 arranged in the center is greater than the amounts of pumping light absorbed by the laser media 51 and 53. The thicknesses of the laser media 51, 52, and 53 are 0.3 mm, 0.5 mm, and 0.5 mm, respectively. The laser media 51, 52, and 53 are arranged with intervals of approximately 0.1 mm therebetween. In the case that the laser media 51, 52, and 53 are pumped by a laser beam within the 810 nm band (that is, in the case that the laser beam $L_1$ is within the 810 nm band), the fluorescent intensity of the maser medium 52 is greater than those of the laser media 51 and 53. The fluorescent peak wavelength of the three laser media 51, 52, and 53 (1.06 μm) substantially matches the fluorescent peak wavelength of the laser medium 52 (1059.9 nm). The entire spectrum width becomes approximately 3 nm, which is two to three times wider than the fluorescent spectrum widths of 1 nm to 1.6 nm of the individual laser media 51 through 53. Note that a coating that favorably transmits the laser beams $L_1$ and $L_2$ are provided on the facets of the solid gain media 51 through 53.

The focusing optical system 12 comprises: an aspherical lens 13 with a focal distance f=8 mm; cylindrical lenses 14 and 15 with focal distances f=−7.7 and f=70, respectively; and an achromatic lens 16 having a focal distance f=60. The laser beam $L_1$ emitted by the semiconductor laser 11 is focused by the focusing optical system 12 such that the beam waist of the pump light beam is at the center of the $Gd_3Sc_2Al_3O_{12}$ medium 52. Note that a laser having a wavelength within the 810 nm band and a beam width of 100 μm is employed as the semiconductor laser 11. The focusing optical system 12 forms a 50 μm×140 μm pump light beam waist within the $Gd_3Sc_2Al_3O_{12}$ medium 52, which is arranged as the central laser medium.

A SESAM having an absorption rate of 0.7% with respect to a wavelength of 1040 nm is employed as the SESAM 7. A concave mirror having a transmissivity of 1% with respect to the laser beam $L_2$ and a curvature radius of 50 mm is employed as the concave mirror 4, and the resonator length is 50 mm in air. Note that this resonator structure enables a beam waist having a $1/e^2$ diameter of 90 μm to be formed on the SESAM 7. The laser media group 5 is provided such that the distance between the SESAM 7 and the center of the $Gd_3Sc_2Al_3O_{12}$ medium 52 is approximately 15 mm. At this position, the $1/e^2$ diameter of the beam becomes approximately 240 μm.

Garnet type laser media to which Nd was added were used in the present laser device. The emission light wavelength band of the present laser device is wider than that of an Nd:YAG laser, for example. Therefore, shortening of pulses becomes possible.

Specifically, in the case that the present laser device is employed, a pulse light beam having a mean output of 100 mW, a pulse width of 3 psec, and a cyclic frequency of 3 GHz was obtained with a pumping power of 2 W.

Three solid gain media were employed in the first embodiment. However, the number of solid gain media is not limited to three. Pulse widths can be freely controlled, by controlling the emission spectrum widths. The thicknesses of the laser media were adjusted to adjust the fluorescent intensity in the present embodiment. Alternatively, the concentration of the added rare earth ion may be adjusted. Any rare earth ion may be applied, and if rare earth ions such as Pr, Sm, Eu, Tb, Dy, Ho, and Er are employed, short pulse lasers within the visible light spectrum can be realized.

Figure 2:
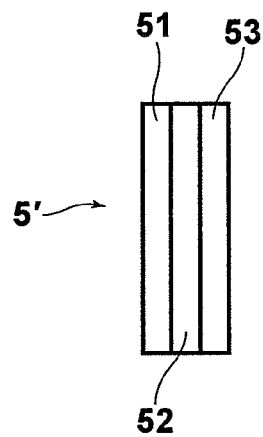
FIG. 2 is a diagram that illustrates a modified laser media group.

Note that in the first embodiment, the solid gain media of the laser media group were provided with intervals of 0.1 mm therebetween. Alternatively, the plurality of solid gain media 51, 52, and 53 may be integrated such that their light entry and light emission surfaces are in contact with each other, as illustrated in the side view of a laser media group 5' of FIG. 2. Individually formed solid gain media may be coupled by adhesive, optical contacts, or the like. As a further alternative, each of the solid gain media may be of a polycrystalline structure, which are then stacked and sintered to be integrated.

Crystalline structure materials other than garnet type materials may be employed as the base material for the laser media. Other than garnet, perovskite and C-rare earth crystalline structure materials are preferred. Further, it is desirable for the plurality of solid gain media to have the same base material, to which the same rare earth ions are added. In the case that the same base material and the same rare earth ions are employed, there are no large differences in stimulated emission cross sectional areas and fluorescent lifetimes. Therefore, matching of threshold values is facilitated, and light emission form all of the laser media can be effectively utilized.

A resonator having a Fabry-Perot type structure was described in the first embodiment. However, any type of structure may be adopted for the resonator, such as the Z-type structure and the bowtie type structure.

At least one wavelength converting element may be provided either within or outside the resonator of the laser device of the first embodiment, and wavelength converted light beams may be obtained.

The present invention is not limited to being applied to mode locked lasers. The present invention functions effectively as a variable wavelength laser if provided with a wavelength controlling element, and also as an optical amplifier.

Figure 3:
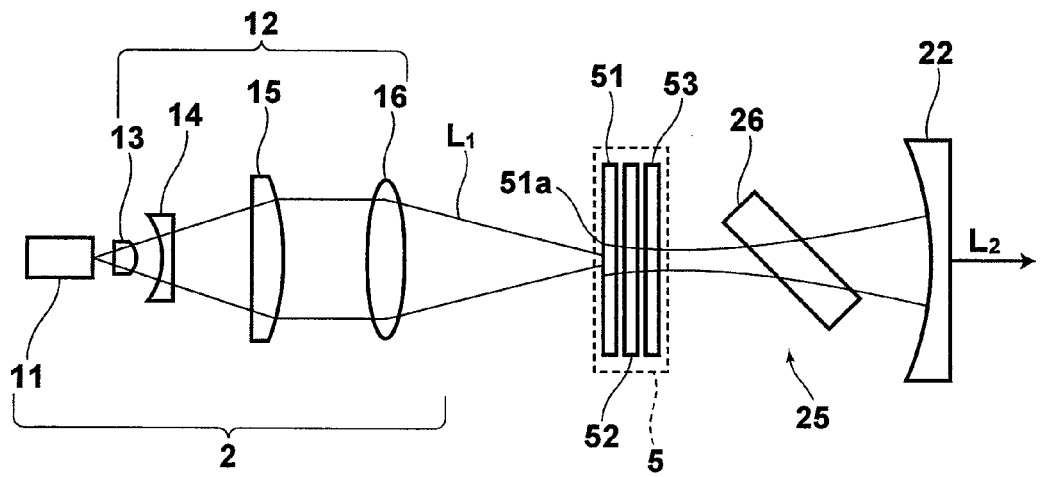
FIG. 3 is a schematic diagram that illustrates the construction of a wavelength variable laser device according to a second embodiment of the present invention.

FIG. 3 is a schematic diagram that illustrates the construction of a wavelength variable laser device 20 according to a second embodiment of the present invention. The variable wavelength laser device 20 is equipped with the same laser media group 5 as the laser device 1 of the first embodiment. A facet of one of the solid gain media (a facet 51*a* toward the pump light beam incident side of the solid gain medium 51, which is arranged closest to the pump light source) and a concave output mirror 22 constitute a resonator 25. The pumping means 2 is the same as that of the laser device 1 of the first embodiment.

A concave output mirror having a transmissivity of 1% with respect to wavelengths within a range of 1060 nm to 1070 nm is employed as the concave output mirror 22. Further, a birefringence filter 26 that functions as a wavelength modulating element is provided within the resonator 25. Linearly polarized light beams can be emitted, by providing the birefringence filter 26 at Brewster angles with respect to the optical axis of the resonator 25.

The variable wavelength laser device 20 is capable of emitting laser light beams $L_2$ within a wavelength range of 1062 nm to 1066 nm, by the operation of the birefringence filter 26.

Figure 4:
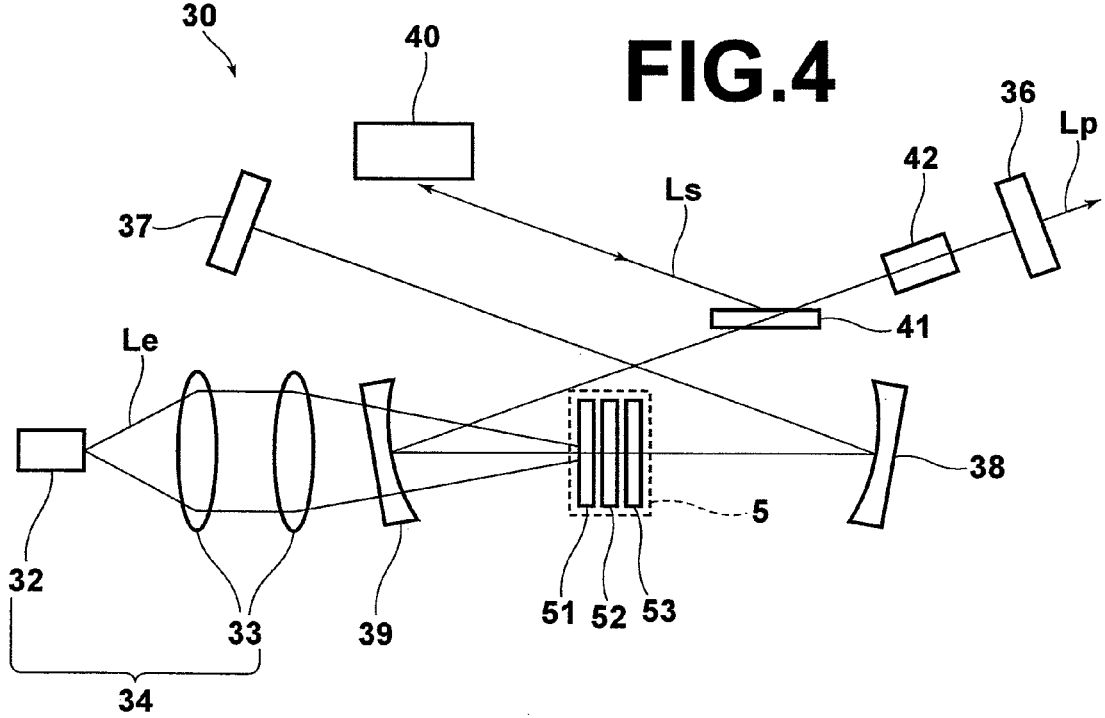
FIG. 4 is a schematic diagram that illustrates the construction of an optical amplifier according to a third embodiment of the present invention.

FIG. 4 is a schematic diagram that illustrates the construction of an optical amplifier 30 according to a third embodiment of the present invention. The optical amplifier 30 is a solid state regenerative laser amplifier that employs the same laser media group 5 as the laser device 1 of the first embodiment.

An Nd:YVO$_4$ mode synchronized oscillator 40 (central wavelength=1064 nm) is prepared separately as a seed laser.

The pulse width of a short pulse laser beam Ls (seed light beam) is stretched by a diffraction grating (not shown). Thereafter, the laser beam Ls is introduced into the regenerative amplifier 30 via a polarizing element 41. A combination 42 of an electro-optic device and a ¼ wavelength plate sets the voltage to be applied to the electro-optic device to be zero. Thereby, a ¼ wavelength phase difference is imparted to the laser beam Ls, which is then input to the regenerative amplifier 30. During the second pass, another ¼ wavelength phase difference is imparted, and the photon is confined within a resonator. A half wavelength voltage is applied to the electro-optic device, or the voltage is turned OFF, to ultimately obtain the photon (for details of this operation, refer to Kochner, Solid State Laser Engineering, Vol. 4, p. 541).

A pumping means 34 comprising a semiconductor laser 32 and an optical system 33 emits a pumping light beam Le. The light beam enters the solid gain media group 5 via a concave mirror 39. The seed light beam Ls is amplified, by reciprocating between reflective mirrors 36 and 37 via concave mirrors 38 and 39. Ultimately, a pulse light beam Lp, of which the amplified pulse has been compressed, is output from the reflective mirror 36.

In the third embodiment, a regenerative amplifier 30 has been described as an example of a solid state laser amplifier. However, the laser amplifier of the present invention is not limited to regenerative amplifiers. The present invention may be applied to single pass type laser amplifiers and multi pass type laser amplifiers, such as double pass type laser amplifiers and 4 pass type laser amplifiers.

What is claimed is:

1. An optical amplifier, comprising:
   a resonator;
   a plurality of solid gain media, having fluorescent spectra that at least partially overlap with each other, provided within the resonator, wherein said solid gain media are crystalline structure materials; and
   pumping means provided outside the resonator, for pumping the plurality of solid gain media, by causing at least one laser beam to enter the plurality of solid gain media as a pumping light beam; wherein:
   the entire fluorescent spectrum width of the plurality of solid gain media is greater than the fluorescent spectrum width of each solid gain medium,
   wherein the resonator is structured in such a manner that a seed light beam which is input into the resonator from the exterior of the resonator reciprocates within the resonator, and that the seed light is amplified by being passed, a plurality of times, through the plurality of solid gain media that have been pumped by the pumping means and output from the resonator, and
   wherein the number and wavelength of fluorescent peaks of each of the plurality of solid gain media are selected, and the solid gain media are arranged such that the entire fluorescent spectrum bandwidth becomes a desired value, wherein:
   the plurality of solid gain medium include $Lu_3Ga_5O_{12}$; $Gd_3Sc_2Al_3O_{12}$ and $Gd_3Sc_2Ga_3O_{12}$ in this order from the direction in which the laser beam enters, each gain medium having fluorescent spectrum bandwidths of less than 1.6 nm, respectively, and the entire spectrum width becomes approximately 3 nm.

2. An optical amplifier as defined in claim 1, wherein:
   the thickness and the concentration of added rare earth ions of each of the plurality of solid gain media are adjusted such that a desired fluorescent intensity is obtained.

3. An optical amplifier as defined in claim 1, wherein:
   the wavelength, number, and power of pump light beams emitted from the pumping means are selected such that the entire fluorescent spectrum bandwidth becomes a desired value.

4. An optical amplifier as defined in claim 1, wherein:
   the plurality of solid gain media are integrated.

5. An optical amplifier as defined in claim 4, wherein:
   each of the plurality of solid gain media is of a polycrystalline structure.

6. An optical amplifier as defined in claim 5, wherein:
   each of the plurality of solid gain media comprises rare earth ions added to a base material having one of a garnet type structure, a C rare earth type structure, and a perovskite type structure.

7. An optical amplifier as defined in claim 6, wherein:
   the plurality of solid gain media are of the same base material, to which the same rare earth ions are added.

8. The laser device as defined in claim 1, wherein each of the plural solid gain media include Nd ions, and wherein the Nd concentration within each solid gain media is 1 at % and an amount of pumping light absorbed by the gain media $Gd_3Sc_2Al_3O_{12}$ is greater than the $Lu_3Ga_5O_{12}$ and $Gd_3Sc_2Ga_3O_{12}$ medium.

9. The laser device of claim 8, wherein the solid gain media are arranged with interval of approximately 0.1 mm therebetween.

10. The laser device of claim 9, wherein the thickness of $Lu_3Ga_5O_{12}$ is less than $Gd_3Sc_2Al_3O_{12}$ and $Gd_3Sc_2Ga_3O_{12}$.

11. The laser device of claim 10, wherein the thickness of $Lu_3Ga_5O_{12}$, $Gd_3Sc_2Al_3O_{12}$ and $Gd_3Sc_2Ga_3O_{12}$ are 0.3 mm, 0.5 mm and 0.5 mm, respectively.

* * * * *